INVENTOR
CHARLES M. PERKINS
BY
Woodhams, Blanchard & Flynn
ATTORNEYS

INVENTOR
CHARLES M. PERKINS
BY
Woodhams, Blanchard & Flynn
ATTORNEYS

INVENTOR
CHARLES M. PERKINS
BY
Woodhams, Blanchard & Flynn
ATTORNEYS

United States Patent Office 3,425,290
Patented Feb. 4, 1969

3,425,290
TWIN COUNTERSHAFT CONSTRUCTION WITH ALL MAIN GEARS MOUNTED CONCENTRICALLY ON MAIN SHAFT
Charles M. Perkins, Phoenix, Ariz., assignor to Eaton Yale & Towne Inc., Cleveland, Ohio, a corporation of Ohio
Continuation of application Ser. No. 577,278, Sept. 6, 1966. This application May 9, 1968, Ser. No. 728,077
U.S. Cl. 74—331         10 Claims
Int. Cl. F16h 3/08, 57/00

ABSTRACT OF THE DISCLOSURE

A means for equalizing the torque on all elements of a multicountershaft transmission wherein a clearance in addition to manufacturing tolerance is provided between all meshing elements.

---

This application is a continuation of Ser. No. 577,278 filed Sept. 6, 1966, now abandoned.

This invention relates to ratio shiftable transmissions, and particularly to a multicountershaft transmission having provision for the equalizing of torque transmission through said countershafts.

In my Patent No. 3,105,395, there has been set forth a highly effective and commerically successful system for obtaining the recognized advantages of a multicountershaft transmission while maintaining in a very simple manner equality of torque transmission through the said countershafts. The transmission set forth in this patent provides both an input shaft and the countershafts on fixed axes with the gears thereof being immovable radially with respect to the respective shafts on which they are mounted. The output shaft, however, or main shaft, is floatingly mounted for movement transverse to a plane connecting the axes of two countershafts and the main shaft gears, when unclutched therefrom, encircle the main shaft with sufficient clearance to permit movement of the main shaft radially within and with respect to said gears. Thus, said main shaft can move radially with respect to the gear to which it is not clutched but the gear to which said main shaft is clutched and said main shaft are radially movable as a single unit transversely with respect to the plane connecting the axes of said two countershafts in order to equalize the torque received onto said main shaft from each of such countershafts. This system works well and has received wide commercial acceptance.

However, this system has one deficiency which has prevented its application in certain instances, namely, that the floating nature of the main shaft prevents its convenient use in those instances where a radial load is imposed thereon, such as where a shaft brake is used or where the output shaft drives a pulley or a radially positioned gear. In this connection, I am not overlooking the fact that the application of Elmer A. Richards and myself, Ser. No. 425,665, now Patent No. 3,237,472, also assigned to the same assignee as the present application, utilizes a floating main shaft with an output shaft on a fixed axis. However, this requires two bearings on the output end of the transmission together with connector means between the floating shaft and the fixed-axis shaft. The necessity for such two bearings undesirably elongates the transmission and the necessity for a connection between the floating shaft and the fixed-axis shaft further complicates both the construction and maintenance of the transmission and increases the cost thereof.

On further study of the situation, it appears that the problem can be divided into two parts. The first part is the necessity for supplying power from the input shaft equally to multiple countershafts. The second problem arises from the fact that the countershafts are connected by a plurality of constantly meshed gears to an output shaft whereby, though only one power transmitting connection is made at a time from said countershafts to said output shaft, provision must be made with respect to the unclutched gears for manufacturing variations from one group of gears to another and/or for circumferential variations in the placement of such gears on their respective shafts. These irregularities can appear not only in the actual manufacturing variations in the teeth of the gear, but can also appear in the positioning of the keyways on the gears. Still further, there will be variations in the amount of clearance provided in the gear keyways for the keys and hence after assembly there will be inevitable variations in the amounts by which said gears will shift circumferentially as a result of such clearances.

In the above-mentioned devices for providing multiple countershaft transmissions, the first of these problems has been dealt with by permitting the main shaft to float, whereby a power transmitting gear clutched thereto can move as needed to equalize the load on said multiple countershafts and thereby maintain the power flow equally through such countershafts, the same being fully explained in said Patent No. 3,105,395. The second of said problems has been dealt with in the same patent by having the several main shaft gears, which are unclutched at a given time, surround, but not engage, the main shaft whereby they can move both radially and circumferentially with respect to said main shaft and with respect to each other, and thereby individually accommodate themselves as needed, and without respect to the position of the power transmitting gear train which is at a given time clutched to the main shaft, to manufacturing variations and installation variations of said gears, both with respect to each other and with respect to the shafts upon which they are mounted.

In designing a transmission having a countershaft mounted in fixed bearings as disclosed and claimed in my application Ser. No. 521,943, now Patent No. 3,335,616, and assigned to the same assignee as this present application, these problems have been dealt with simultaneously in one embodiment by providing floatable sleeve connections between the main shaft gears supported on and by the countershaft gears and the main shaft, and in another embodiment by providing a floating input gear to deal with the first problem above mentioned and sleeve connections between the main shaft gears and the main shaft to provide for the second problem above mentioned. This construction likewise has proved efficient and effective.

However, upon still further consideration of the problem, an additional solution to the two problems above set forth has been developed which it is the purpose of this application to protect. Particularly, it has been discovered that with the first problem above mentioned, dealt with by providing a floating gear between the power input shaft and the countershafts, the second problem above mentioned can be dealt with by providing some extra backlash between the main shaft gears and the countershaft gears whereby to permit the unclutched ones of said gears to make the necessary circumferential adjustments with respect to each other to accommodate same to the manufacturing irregularities with respect to each other as above described. In this manner, still further and different means are provided for accomplishing at least the broader objectives of said Patent No. 3,105,395 and of said application Ser. No. 521,943.

Accordingly, the objects of the invention will include:
(1) To provide a multicountershaft transmission wherein the torque transmitted through said multiple countershafts is automatically and continuously equalized and wherein the main shaft is mounted in fixed and widely spaced bearings whereby to carry a radial load at the output end thereof.

(2) To provide a multicountershaft transmission, as aforesaid, requiring only a single bearing at the output end of the main shaft of the transmission whereby to minimize the over-all length thereof.

(3) To provide a multicountershaft transmission, as aforesaid, capable of attaining the major objectives set forth in my Patent No. 3,105,395 while utilizing a main shaft mounted on a fixed axis.

(4) To provide a multicountershaft transmission, as aforesaid, primarily applicable to a dual countershaft arrangement, wherein both the clutched and unclutched main shaft gears are mounted concentrically and immovably with respect to the axis of the main shaft but are movable rotatively with respect to the countershaft gears, namely by providing sufficient clearance, or backlash, between the countershaft gears and the main shaft gears meshed therewith to permit such movement.

(5) To provide a multicountershaft transmission, as aforesaid, which will have a high degree of reliability in operation but which will have low manufacturing and maintenance costs.

Other objects and purposes of the invention will be apparent to persons acquainted with apparatus of this general type upon reading the following specification and upon inspection of the accompanying drawings.

GENERAL DESCRIPTION

In general, the invention comprises providing at least two similar countershafts and arranging same at equally spaced intervals around axially aligned input and main shafts. Similar countershaft gears are arranged respectively opposite each other on said countershafts and annular main shaft gears are each respectively supported on and by the main shaft between and in constant engagement with such similar countershaft gears. To main shaft is selectively clutchable to one of said main shaft gears at a time for establishing a selected transmission ratio. Means are provided for mounting said main shaft gears concentrically and radially immovable with respect to the axis of said main shaft. Tangential movement of the peripheries (or teeth) of said main shaft gears with respect to the peripheries (or teeth) of said countershaft gears is then provided by creating sufficient backlash between the countershaft gears and respectively engaged main shaft gears to enable such movement to occur.

DETAILED DESCRIPTION

Figure 1:
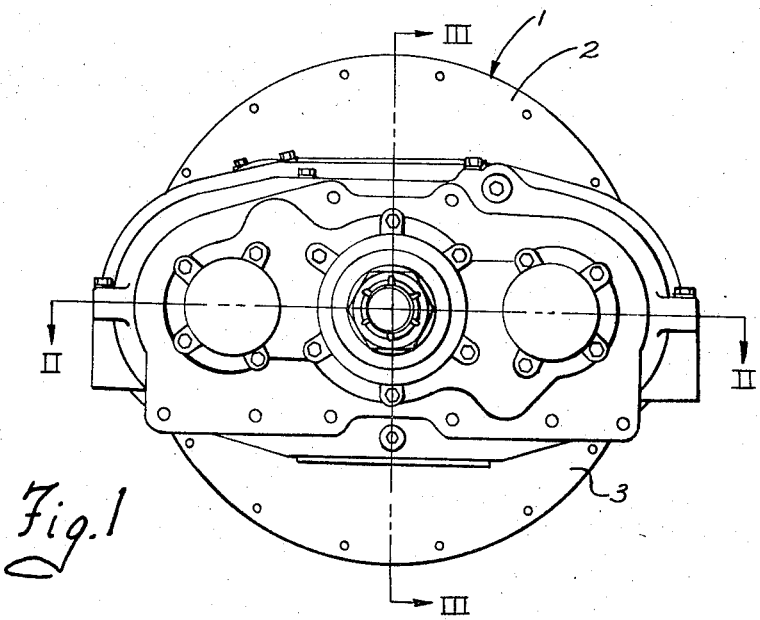
FIGURE 1 is an end view of a transmission embodying the invention.
Figure 2:
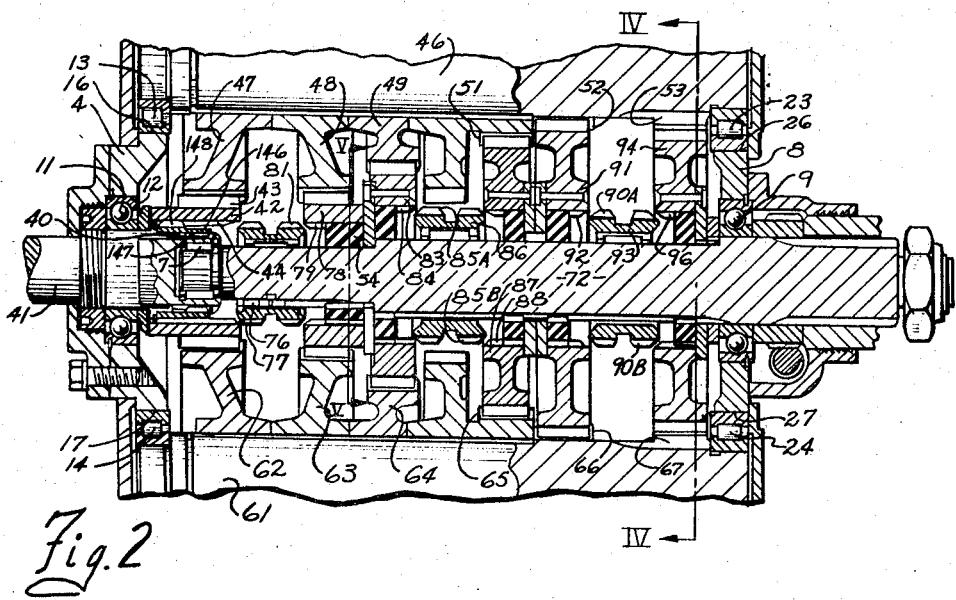
FIGURE 2 is a central section taken on line II—II of FIGURE 1 of a transmission embodying one form of the invention.

In the following descritpion certain terminology will be used for convenience of reference but it will be understood that such terminology will be for convenience only and has no limiting significance. For example, the terms "forward" and "rearward" will refer to directions forward and rearward of the vehicle in which the transmission is installed. Thus, the leftward portion as appearing in FIGURE 2 is forward and the rightward portion of the transmission as appearing in said figure is rearward. The terms "rightward" and "leftward" will refer to directions as taken in the drawings in connection with which said terminology is used. The terms "inward" and "outward" will refer to directions toward and away from the geometric center of the apparatus. All terms mentioned foregoing include all normal derivatives and equivalents of each thereof.

Referring now to the drawings there is provided a casing 1 which is horizontally split into upper and lower portions 2 and 3, respectively. Said lower portion 3 has a forward end wall 4 and a rearward end wall 8. A suitable, depending, oil sump 10 may be provided, if desired.

Each of said walls is provided with recesses for the reception of the various shaft bearings. The input shaft bearing 11 is supported by a suitable recess 12 in the wall 4. The countershaft bearings 13 and 14 are supported in suitable recesses 16 and 17, respectively, in said forward end wall. Countershaft bearings 23 and 24 are supported in recesses 26 and 27 in the rearward wall 8.

An input shaft 41 is supported in the bearing 11 and carries splines 40 thereon. A connector sleeve 146 has short internal splines 147 and short external splines 148 axially spaced from said internal splines 147. An input gear 42 has internal splines 44 thereon cooperable with said external splines 148. A first countershaft 46 is supported by the bearings 13 and 23 and carries thereon and fixed for rotation therewith the countershaft ratio gears 47, 48, 49, 51, 52, and 53.

A second countershaft 61 is supported within the bearings 14 and 24 and is in all respects preferably identical with the first countershaft 46. Second countershaft ratio gears 62–67 are mounted on and fixed for rotation with the second countershaft 61 and are preferably respectively identical with the ratio gears 47, 48, 49, 51, 52 and 53.

Said input gear 42 is between and constantly engaged with the countershaft gears 47 and 62 but through the action of sleeve 146 is radially movable with respect to the input shaft 41 while constantly clutched thereto. The splines 40 on the input shaft and the splines 148 of said connector sleeve 146 are preferably axially crowned to facilitate the said floating movement.

The main transmission shaft 72 is arranged substantially coaxial with the input shaft 41 and is supported on suitable fixed bearings, one of which will conveniently be the bearing 7 within the input shaft 41 and the other is the bearing 9 in the rear wall 8 of the transmission casing. Gears are provided on the main shaft for engagement with the countershaft gears and said countershaft gears and/or said main shaft gears are appropriately clutched, to their respective shafts in any convenient manner to provide driving connections from the two countershafts through a selected pair of countershaft gears to and through the main shaft gear associated therewith to the main shaft. Bushings 54 are provided within each of the main shaft gears 78, 83, 87, 91 and 94 respectively and closely mount said main shaft gears concentrically on the main shaft and hold same against any appreciable movement with respect to the axis of said main shaft. The particular method of clutching hereinafter described will thus be recognized as illustrative only and not limiting.

Said main shaft may be utilized with, or as, the input of an auxiliary transmisison or same may be connected directly, if desired, or through other means, to the load being driven.

In this particular embodiment, the slider 76 is slidingly mounted on splines on the forward end of said main shaft 72 and carries clutch teeth 77 which are engageable with the clutch teeth 44 upon leftward movement of said slider 76. Slider 76 further carries clutch teeth 81 thereon engageable with the internal clutch teeth 79 formed on the main shaft gear 78 upon rightward movement of the slider 76, the main shaft gear 78 being supported by the bushing 54 between the countershaft gears 48 and 63. Said slider 76 is provided with any suitable means for effecting axial movement thereof, such as by the usual grooves and a shift fork 82 (FIGURE 3).

The main shaft gear 83 is supported between, but not by, the countershaft gears 49 and 64 and has a set of internal clutch teeth 84 for engagement with the external teeth 85A of the slider 86. The gear 87 is supported between, but not by, the countershaft gears 51 and 65 and is provided with internal clutch teeth 88 for engagement with the teeth 85B of the slider 86. Said slider 86 is axially slidable for alternate, but only alternate, engagement of said clutch teeth 84 or 88 and such axial movement is affected in any convenient manner, such as by a shift fork 89 (FIGURE 3). The main shaft gear 91 is supported between, but not by, the countershaft gears 52 and 66 and is provided with internal clutch teeth 92 for engagement of the teeth 90A of the slider 93. The main shaft gear 94 is supported between the usual reverse idler gears 105 and 110 (FIGURE 4) which are in turn engaged with the gears 53 and 67. The gear 94 has internal clutch teeth 96 for engagement with the teeth 90B on the slider 93.

Figure 3:
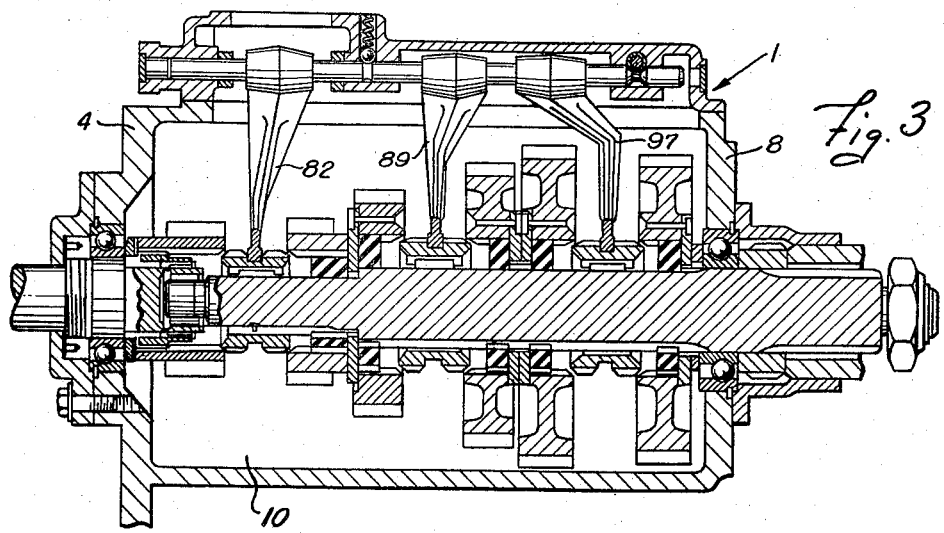
FIGURE 3 is a sectional view taken on the line III—III of FIGURE 1.
Figure 4:
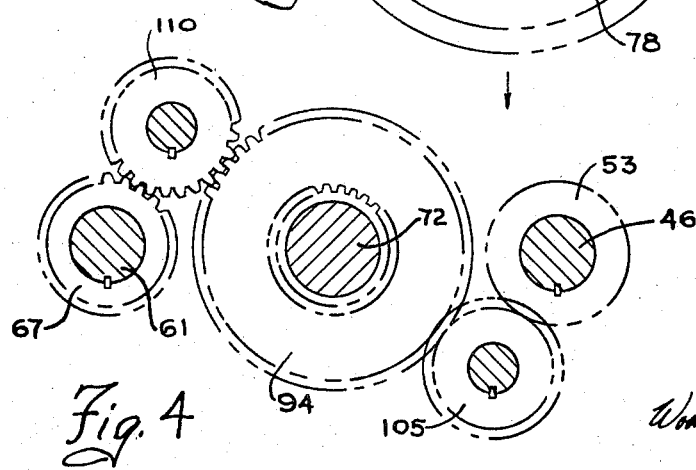
FIGURE 4 is a section taken on the line IV—IV of FIGURE 2.

The slider 93 is arranged for axial movement by any convenient means, such as by a shift fork 97 (FIGURE 3).

Each of said gears 78, 83, 87, 91 and 94, may be collectively termed "main shaft gears," since they are all capable of driving the main shaft. However, it will in this particular case be recognized that the main shaft gears are supported on, and when clutched are rotatable with, the main shaft and have only a toothed connection with the countershaft gears. This contrasts with the apparatus disclosed and described in the above-mentioned Ser. No. 521,943 wherein all said main shaft gears were in toothed engagement with, and supported upon and by, the countershaft gears and, at least the unclutched ones of the main shaft gears, were radially movable with respect to the main shaft.

The teeth of each main shaft gear, and of the respectively engaged countershaft gears, are of course provided with a normal backlash according to conventional practice and for the purpose thereof. However, to carry out the invention, said teeth are also provided with an additional backlash therebetween so that any given set of intermeshed main shaft countershaft gears will, when unclutched with respect to the main shaft, not bind each other because of variations in circumferential positions of the countershaft gears resulting from manufacturing variations in the gear teeth or in the orientation of the countershaft gears on their respective shafts. In other words, as previously described in connection with my application Ser. No. 521,943, variations in tooth thickness and/or spacing between, and/or orientation of, gears in the power train at a given time is compensated for by a slight radial movement of the input gear in a direction generally transverse of a plane connecting the two countershafts. However, such variations in meshed but unclutched main shaft-countershaft gear sets are compensated by the additional backlash above mentioned. This latter is illustrated by FIGURES 6A–6D.

Figure 6A:
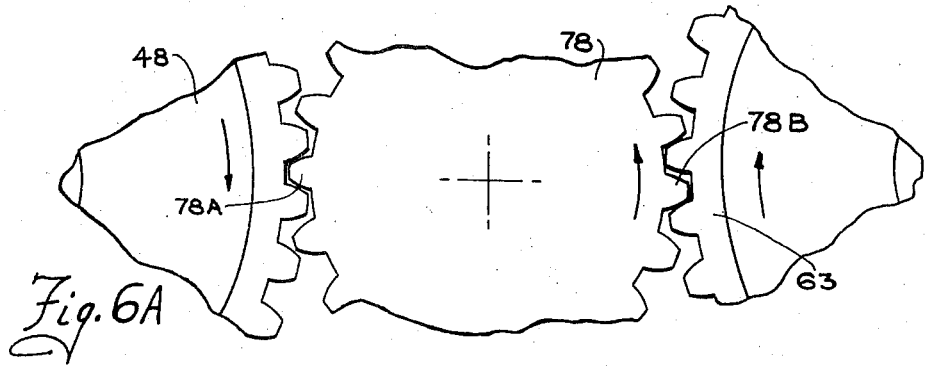
FIGURES 6A–6D are diagrammatic views similar to FIGURE 5 but showing the relative positions of the gear teeth in three normal conditions of operation.
Figure 6B:
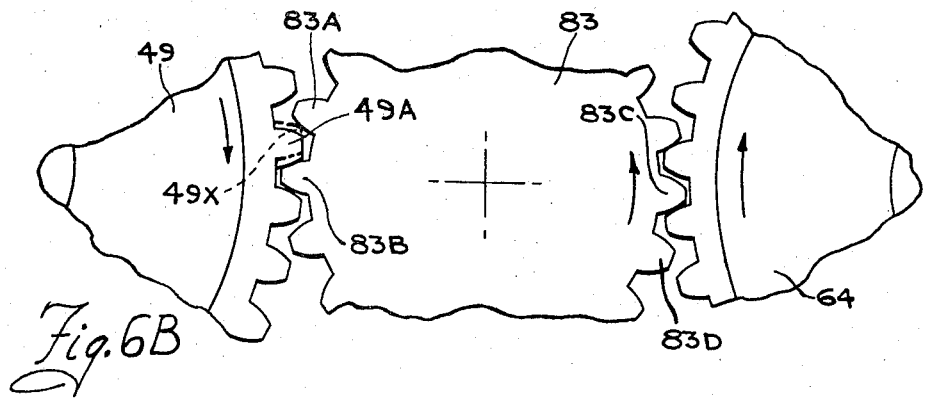

In FIGURE 6A, there is shown the normal position of clutched, here driving, gears with respect to each other, the gears 48 and 63 both normally contacting opposite teeth 78A and 78B of the gear 78 to effect rotation thereof. FIGURE 6B, however, represents one position one set of gears, such as the gears 49, 83 and 64, may occupy when same are unclutched and a different set of gears, such as the gears 48, 63 and 78, are clutched and driving. In this example, the teeth 83C and 83D at the rightward side of the main shaft gear 83 are in normal contact with each other but the tooth 49A may tend to occupy a position in contact with, or in actual interference with, the tooth 83A as shown by the broken lines 49X instead of its normal position in contact with the tooth 83B. The extra clearance above mentioned permits such irregular movement of tooth 49A toward the tooth 83A without binding therebetween while gear 83 remains upon a fixed center. This is contrasted to the construction of both the above-mentioned patent and application wherein the gear 83 would move in its entirety with respect to the axes of the countershaft to accommodate such irregularity.

Figure 6C:
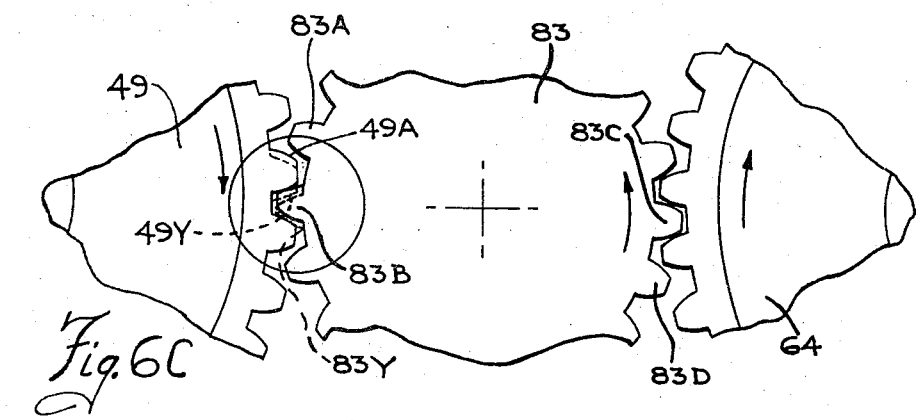
Figure 6D:
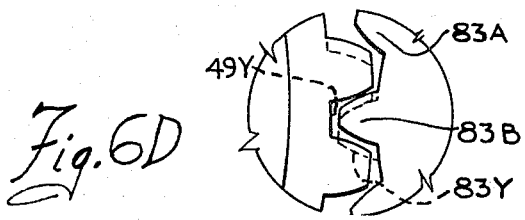

FIGURE 6C illustrates essentially the reverse of the foregoing situation, namely, wherein the tooth 49A is offset ahead of its normal (solid line) position so as to occupy the position indicated by the broken lines 49Y of FIGURE 6C and thereby interfere with the tooth 83B. In such case, it moves the tooth 83B downwardly to the position indicated by the broken line 83Y. Bearing in mind that gear 83 is unclutched, this moves the teeth 83C and 83D upwardly making use of the extra clearance provided between said teeth and the adjacent teeth of the gear 64.

Since the position of the gears of the unclutched gear set with respect to each other will in any given instance be determined by the position with respect to each other of whatever gear set is clutched, the amount of extra clearance to provide will be a function both of the error permitted (tolerance) in the manufacturing of the gears in question and the error permitted in the positioning of said gears on their respective shafts together with the ratio of the radii of the countershaft gears mated with a clutched main shaft gear with respect to the radii of the countershaft gears mated with unclutched main shaft gears.

More specifically, it can be shown by a mathematical analysis that the total circumferential displacement of one countershaft gear of an unclutched set with respect to the other countershaft gear of the same set (recognizing that in any given instance the teeth of the clutched gear set will be in contact with each other) equals $$u + \left(\frac{r_u}{r_c}\right)c$$

wherein:

the circumferential error (tolerance) of the clutched gear set equals $c$,
The circumferential error (tolerance) of the unclutched gear set equals $u$,
The radius of the clutched countershaft gears, equals $r_c$,
The radius of the unclutched countershaft gears equals $r_u$.

Since, as shown above in the explanation to FIGURES 6A, 6B and 6C, all of the errors may, and usually will, appear on one side or the other side of the main shaft gear, all of the required extra tolerance should be available between any two teeth. However, since same can be divided between said two adjacent teeth, only half of the extra tolerance required by the above-mentioned formula needs to be applied to any one tooth. Therefore, the clearance or backlash provided for each tooth of both countershaft gears and main shaft gears will be the largest quantity obtained by comparing each pair or each set of gears with every other set of gears and computing the normal backlash provided for such gear plus one-half of the quantity $$u + \left(\frac{r_u}{r_c}\right)c$$

As a practical manufacturing matter, however, when such maximum required additional clearance is determined, it will normally be applied to all main shaft-countershaft gear sets equally and same will in most cases be satisfactory.

OPERATION

The operation of the apparatus has been somewhat indicated previously but will be reviewed fully to insure a clear understanding of the invention.

Input power from the shaft 41 is supplied to the input gear 42 and is thence delivered to the countershafts 46 and 61. By suitable manipulation of one of the shift forks 82, 89 and 97, one of the sliders connected thereto is engaged with a selected main shaft gear, such as the gear 78, and the power is then conducted from the two countershafts through such gear to the main shaft 72. The power then travels through the main shaft 72 to whatever load is connected thereto, either to the ultimate load or to further gearing as shown in Patent No. 3,105,395.

Turning now to the relationship between the main shaft of the transmission and the countershafts it will be emphasized that in this construction as contrasted to my application Ser. No. 521,943 the main shaft supports the several main shaft gears rotatably with respect thereto and is clutched to such thereof as is desired to be brought into the power train.

The main shaft gears themselves will in their initial assembly be positioned between the countershaft gears associated therewith and will be assumed to be centered therebetween within the scope of quite close tolerances. As a given pair of countershaft gears act on the main shaft gear associated therewith, a balanced couple is created by the equal and oppositely directed forces applied to the opposite sides of the main shaft gear. This will be effective inasmuch as both of said countershafts are rigidly locked to a single, but floatable, input gear and said countershafts are through said clutched main shaft gear also rigidly locked to a single output shaft.

Figure 5:
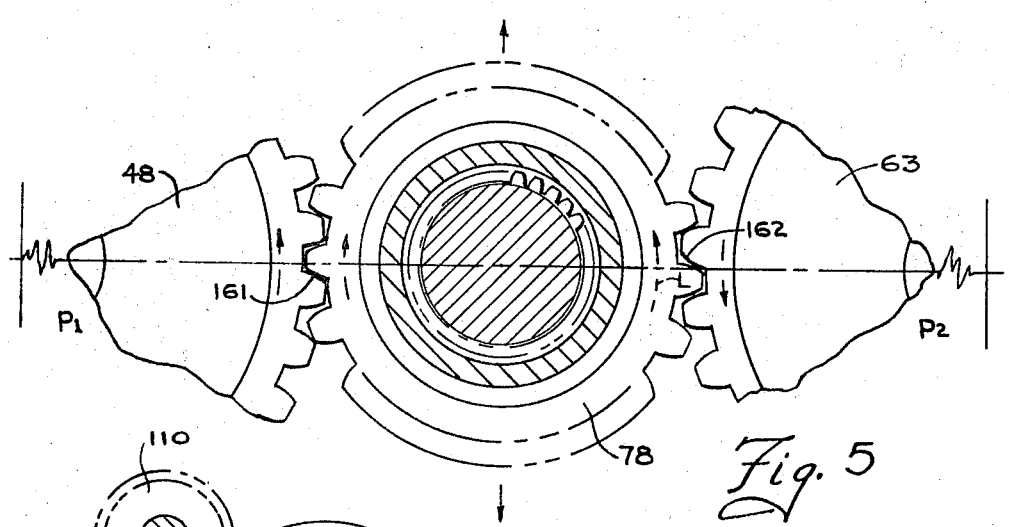
FIGURE 5 is a diagrammatic fragmentary section taken on the line V—V of FIGURE 2 and showing on an exaggerated scale the parts in one condition of operation.

Now assuming that one countershaft gear, which for example may be taken as the countershaft gear 48, is irregular in shape, either within itself or as compared to the opposite countershaft gear, it may, if no compensating adjustment is made, tend to develop more pressure due to such irregularity on the associated main shaft gear 78 in an upward direction than is counterbalanced by the downwardly acting pressure from gear 63. In such case, the load torque on the input gear 42 will move said input gear 42 in a direction to restore the balance between the said input gear and the two countershaft gears connected thereto. This has been sufficiently set forth in previous applications and patents, such as Patent No. 3,105,395 and Ser. No. 521,943 and does not need repetition here. It need only be said here that in the manner above described, the large clearances between the teeth of the main shaft gear (as gear 78 in FIGURE 5) and the teeth of the countershaft gears (as gears 48 and 63 in FIGURE 5) permit freedom from binding therebetween of the unclutched gear sets. Thus, in this arrangement, the freedom from binding of the unclutched gear sets, which is accomplished in the structure of Ser. No. 521,943 by the floating of the unclutched main shaft gears, is here accomplished by said tooth clearances.

In the example above given, attention was directed toward the countershaft gears 48 and 63 and the main shaft gear 78 associated therewith. It will be apparent that the same effect will be obtained as the main shaft gear of each gear set becomes clutched to the main shaft.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A multicountershaft transmission, comprising:
   a plurality of rotatable countershafts having countershaft gears fixedly mounted thereon, said countershaft gears being arranged to form a plurality of countershaft gear groups with each group comprising gears on at least two countershafts;
   drive means for applying substantially equal amounts of torque to said countershafts;
   a main shaft having a plurality of main shaft gears supported thereon for rotation with respect thereto;
   clutching means for selectively clutching said main shaft gears to said main shaft;
   each of said main shaft gears being disposed between and meshed with the gears of a group of said countershaft gears to form therewith a gear set, the clearance between the teeth of each main shaft gear and the teeth of the countershaft gears meshed therewith being at least as great as the normal clearance plus extra clearance at least sufficient to permit the countershaft gears of each unclutched gear set to respond to the relative positions with respect to each other of the countershaft gears in a clutched gear set without binding against the respective main shaft gear of each said unclutched set, whereby all of the main shaft gears which are unclutched at a given time will be free from binding against any of the countershaft gears meshed therewith in spite of variations in relative positions between said countershaft gears regardless of which gear set is clutched at a given time.

2. A multicountershaft transmission according to claim 1, in which said drive means comprises an input shaft and torque transfer means drivingly connecting said input shaft to said countershafts, said torque transfer means including transversely floatable means for equalizing torque transmission from said input shaft to said countershafts.

3. A multicountershaft transmission according to claim 2, in which said torque transfer means includes an input gear coupled to said input shaft and meshed with further countershaft gears affixed to said countershafts, said input gear being mounted for radial movement with respect to said input shaft and said countershafts in a direction generally transverse to a plane extending through the axes of two countershafts.

4. A multicountershaft transmission according to claim 3, in which the transversely floatable means includes a sleeve coupled between said input gear and said input shaft, said sleeve having external splines meshed with internal splines on said input gear, said sleeve also having internal splines meshed with splines on said input shaft, said internal and external splines on said sleeve being axially spaced from each other to maintain a continuous driving connection between said input shaft and said input gear even though said input gear moves radially with respect to said input shaft.

5. A multicountershaft transmission according to claim 1, in which said countershafts are maintained at a constant spacing from each other and said main shaft is supported for rotation about a fixed axis of rotation.

6. A multicountershaft transmission as defined in claim 1, including bushings positioned between said main shaft gears and said main shaft whereby unclutched main shaft gears may rotate freely and concentrically with respect to said main shaft.

7. A multicountershaft transmission as defined in claim 1, in which there are only two countershafts.

8. A multicountershaft transmission as defined in claim 1, wherein said extra clearance for each individual gear set is at least the largest amount obtained by comparing the individual gear set as an unclutched gear set with each remaining gear set as a clutched gear set pursuant to the following formula:

$$u + \left(\frac{r_u}{r_c}\right)c$$

wherein $u$ equals the circumferential error of the unclutched gear set;
wherein $c$ equals the circumferential error of the clutched gear set;
$r_u$ equals the radius of the unclutched countershaft gears; and
$r_c$ equals the radius of clutched countershaft gears of a given gear set.

9. A multicountershaft transmission as defined in claim 8, wherein the extra clearance for each tooth is equal to one-half of the extra clearance derived from said formula.

10. A multicountershaft transmission as defined in claim 8, wherein said extra clearance is uniform for all sets of gears and is substantially equal to the largest extra clearance derived with respect to any gear set according to said formula.

References Cited

UNITED STATES PATENTS

| | | | |
|---|---|---|---|
| 3,105,395 | 10/1963 | Perkins | 74—531 |
| 3,237,472 | 3/1966 | Perkins | 74—531 |
| 3,283,613 | 11/1966 | Perkins | 74—331 |
| 3,335,616 | 8/1967 | Perkins | 74—331 |

DONLEY J. STOCKING, *Primary Examiner.*

HENRY S. LAYTON, *Assistant Examiner.*

U.S. Cl. X.R.

74—410